United States Patent
Sim et al.

(10) Patent No.: US 11,973,966 B2
(45) Date of Patent: Apr. 30, 2024

(54) METHOD AND APPARATUS FOR EFFICIENTLY CODING RESIDUAL BLOCKS

(71) Applicants: Hyundai Motor Company, Seoul (KR); Kia Motors Corporation, Seoul (KR); Kwangwoon University Industry-Academic Collaboration Foundation, Seoul (KR)

(72) Inventors: Dong Gyu Sim, Seoul (KR); Jong Seok Lee, Seoul (KR); Sea Nae Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Motors Corporation, Seoul (KR); Kwangwoon University Industry-Academic Collaboration Foundation, Seoul (KR)

(*) Notice: Subject to any disclaimer, the term of this patent is extended or adjusted under 35 U.S.C. 154(b) by 265 days.

(21) Appl. No.: 17/438,305

(22) PCT Filed: Mar. 12, 2020

(86) PCT No.: PCT/KR2020/003455
§ 371 (c)(1),
(2) Date: Sep. 10, 2021

(87) PCT Pub. No.: WO2020/185009
PCT Pub. Date: Sep. 17, 2020

(65) Prior Publication Data
US 2022/0191531 A1    Jun. 16, 2022

(30) Foreign Application Priority Data
Mar. 12, 2019 (KR) .......................... 10-2019-0028364

(51) Int. Cl.
*H04N 19/46* (2014.01)
*H04N 19/105* (2014.01)
(Continued)

(52) U.S. Cl.
CPC ........... *H04N 19/46* (2014.11); *H04N 19/105* (2014.11); *H04N 19/176* (2014.11);
(Continued)

(58) Field of Classification Search
CPC .... H04N 19/46; H04N 19/105; H04N 19/176; H04N 19/186; H04N 19/70; H04N 19/82
See application file for complete search history.

(56) References Cited

U.S. PATENT DOCUMENTS 8,995,527 B2 * 3/2015 Panchal ............... H04N 19/147
375/240.15
10,405,001 B2 * 9/2019 Kim ...................... H04N 19/18
(Continued)

FOREIGN PATENT DOCUMENTS

| AU | 2013200051 | * | 1/2013 |
| CA | 2801409 | * | 6/2011 |

(Continued)

OTHER PUBLICATIONS

Andersson, K. et al., "CE11: Deblocking for 4 x N, N x 4 and 8 x N and N x 8 block boundaries that not are aligned with 8x8 grid (test 11.2.1)", Document: JVET-M0299-v1, Joint Video Experts Team (JVET) of ITU-T SG 16 WO 3 and ISO/IEC JTC 1/SC 29/WG 11, 13th Meeting: Marrackech,MA (Jan. 9-18, 2019) 7 pages.
(Continued)

*Primary Examiner* — Zaihan Jiang

(57) ABSTRACT

A video decoding method and a video decoding apparatus are configured to decode video. To efficiently code residual blocks obtained from block-based motion compensation, a video encoding apparatus and the video decoding apparatus
(Continued)

divide a relevant residual block of a current block into two subblocks in a horizontal or vertical direction and encode one residual subblock alone out of the two residual subblocks.

6 Claims, 10 Drawing Sheets

(51) Int. Cl.
*H04N 19/176* (2014.01)
*H04N 19/186* (2014.01)
*H04N 19/70* (2014.01)
*H04N 19/82* (2014.01)

(52) U.S. Cl.
CPC ........... *H04N 19/186* (2014.11); *H04N 19/70* (2014.11); *H04N 19/82* (2014.11)

(56) References Cited

U.S. PATENT DOCUMENTS

| | | | |
|---|---|---|---|
| 11,122,296 B2 * | 9/2021 | Leleannec | H04N 19/61 |
| 11,622,120 B2 * | 4/2023 | Zhu | H04N 19/176 |
| | | | 375/240.03 |
| 2006/0018559 A1 * | 1/2006 | Kim | H04N 19/157 |
| | | | 375/E7.14 |
| 2011/0206123 A1 * | 8/2011 | Panchal | H04N 19/70 |
| | | | 375/E7.243 |
| 2013/0022115 A1 | 1/2013 | Oh | |
| 2014/0105306 A1 * | 4/2014 | Naito | H04N 19/433 |
| | | | 375/240.16 |
| 2015/0358631 A1 * | 12/2015 | Zhang | H04N 19/176 |
| | | | 375/240.16 |
| 2021/0084313 A1 * | 3/2021 | Nguyen | G06T 5/002 |
| 2023/0034698 A1 * | 2/2023 | Wang | H04N 19/44 |

FOREIGN PATENT DOCUMENTS

| | | |
|---|---|---|
| KR | 2012-0018507 A | 3/2012 |
| KR | 10-2012-0115507 A | 10/2012 |
| KR | 2012-0118507 A | 10/2012 |
| KR | 10-2017-0013274 A | 2/2017 |
| KR | 10-2018-0085526 A | 7/2018 |
| RU | 2549157 C1 | 4/2015 |
| WO | 2016/043933 A1 | 3/2016 |
| WO | 2018/221817 A1 | 12/2018 |

OTHER PUBLICATIONS

Sugimoto, K. et al., "CE6.f: LUT-based adaptive filtering on intra prediction samples", Document: JCTVC-E069, Joint Collaborative Team on Video Coding (JCT-VC) of ITU-T SG16 WP3 and ISO/IEC JTC 1/SC29/WG11, 5th Meeting: Geneva, CH (Mar. 16-23, 2011) 12 pages.

H. Jang et al., "CE11-related: subblock boundary filter at 8x8 Grid", Joint Video Experts Team (JVET), 13th Meeting: Marrakech, MA, Jan. 9-18, 2019.

Y. Zhao et al., "CE6: Sub-block transorm for inter blocks (CE6.4.1)", Joint Video Experts Team (JVET), 13th Meeting: Marrakech, MA, Jan. 9-18, 2019.

* cited by examiner

METHOD AND APPARATUS FOR EFFICIENTLY CODING RESIDUAL BLOCKS

CROSS-REFERENCE TO RELATED APPLICATION

This application is a National Phase application filed under 35 USC 371 of PCT International Application No. PCT/KR2020/003455 with an International Filing Date of Mar. 12, 2020, which claims under 35 U.S.C. § 119(a) the benefit of Korean Patent Application No. 10-2019-0028364 filed on Mar. 12, 2019, the entire contents of which are incorporated by reference herein.

BACKGROUND

(a) Technical Field

The present disclosure relates to the encoding and decoding of video, more particularly, to a method and an apparatus for coding residual blocks efficiently.

(b) Description of the Related Art

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoding unit can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better encoding efficiency and higher image quality improvement over existing compression techniques.

In a video encoding process, a video encoding apparatus generates a residual block by performing prediction of a current block through intra prediction or inter prediction and then subtracting sample values of the current block from sample values of the prediction block. The video encoding apparatus splits the residual block into one or more transform blocks, applies a transform to the one or more transform blocks, and thereby transforms residual values of the transform blocks from the pixel domain to the frequency domain. Depending on the prediction accuracy, there may be no or few residual values in some regions of the residual block, and it is occasionally very inefficient to blindly divide the residual block into smaller-sized transform blocks.

SUMMARY

The present disclosure in some embodiments seeks to provide a scheme of coding residual blocks, suitable for those residual blocks having some regions with no or little residual values.

At least one aspect of the present disclosure provides a video decoding apparatus, including a decoding unit, a prediction unit, an inverse quantization and inverse transform unit, an adder, and a filter unit. The decoding unit is configured to decode, from a bitstream, a flag indicating whether residual signals corresponding only to a partial region of a current block have been encoded, and to decode, from the bitstream, transform coefficient information for one subblock of two subblocks split from the current block to reconstruct transform coefficients when the flag indicates that the residual signals corresponding only to the partial region of the current block have been encoded. The prediction unit is configured to predict the current block to generate a prediction block. The inverse quantization and inverse transform unit is configured to perform inverse quantization and inverse transform on the transform coefficients in the one subblock for which the transform coefficient information has been decoded to generate a residual block for the current block. The adder is configured to add up the prediction block and the residual block to reconstruct the current block. The filter unit is configured to set a grid of N samples at regular intervals in horizontal and vertical directions and to perform deblock filtering on a boundary between the two subblocks in the current block that coincides with a boundary of the grid.

Another aspect of the present disclosure provides a video decoding method, the method including the steps of (i) decoding, from a bitstream, a flag indicating whether residual signals corresponding only to a partial region of a current block have been encoded, (ii) reconstructing transform coefficients by decoding, from the bitstream, transform coefficient information for one subblock of two subblocks split from the current block, when the flag indicates that the residual signals corresponding only to the partial region of the current block have been encoded, (iii) predicting the current block to generate a prediction block, (iv) generating a residual block for the current block by performing an inverse quantization and an inverse transform on the transform coefficients in the one subblock for which the transform coefficient information has been decoded, (v) reconstructing the current block by adding up the prediction block and the residual block, and (vi) setting a grid of N samples at regular intervals in horizontal and vertical directions and perform deblock filtering on a boundary between the two subblocks in the current block that coincides with a boundary of the grid.

DETAILED DESCRIPTION

Figure 1:
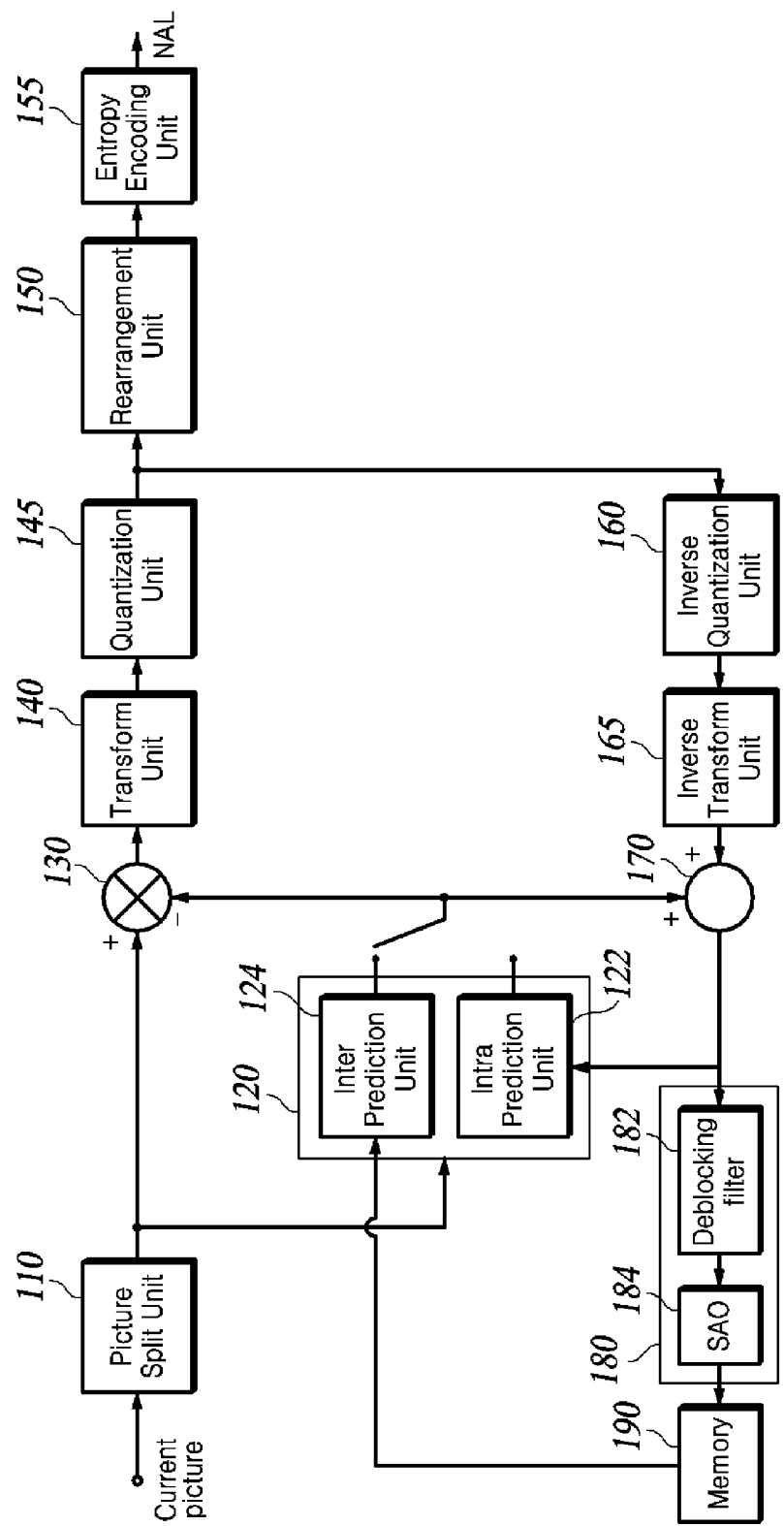
FIG. 1 is a block diagram illustrating a video encoding apparatus that can implement the techniques of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

FIG. 1 is a block diagram illustrating a video encoding apparatus that can implement the techniques of the present disclosure. Hereinafter, a video encoding apparatus and sub-components of the apparatus will be described with reference to FIG. 1.

The video encoding apparatus may be configured including a picture split unit 110, a prediction unit 120, a subtractor 130, a transform unit 140, a quantization unit 145, a rearrangement unit 150, an entropy encoding unit 155, an inverse quantizer 160, an inverse transform unit 165, an adder 170, a filter unit 180, and a memory 190.

The respective components of the video encoding apparatus may be implemented as hardware or software, or hardware and software combined. Additionally, the function of each component may be implemented by software and the function by software for each component may be implemented to be executed by a microprocessor.

A video is composed of a plurality of pictures. The pictures are each split into a plurality of regions, and encoding is performed for each region. For example, one picture is split into one or more tiles or/and slices. Here, one or more tiles may be defined as a tile group. Each tile or/and slice is split into one or more Coding Tree Units (CTUs). And each CTU is split into one or more Coding Units (CUs) by a tree structure. Information applied to the respective CUs are encoded as syntaxes of the CUs, and information commonly applied to CUs included in one CTU is encoded as a syntax of the CTU. Additionally, information commonly applied to all blocks in one slice is encoded as a syntax of a slice header, and information applied to all blocks constituting one picture is encoded in a Picture Parameter Set (PPS) or a picture header. Furthermore, information commonly referenced by a plurality of pictures is encoded in a Sequence Parameter Set (SPS). Additionally, information commonly referenced by one or more SPSs is encoded in a Video Parameter Set (VPS). In the same manner, information commonly applied to one tile or tile group may be encoded as a syntax of a tile header or tile group header.

The picture split unit 110 determines the size of a coding tree unit (CTU). Information on the size of the CTU (CTU size) is encoded as a syntax of the SPS or PPS and transmitted to a video decoding apparatus.

The picture split unit 110 splits each picture constituting the video into a plurality of coding tree units (CTUs) having a predetermined size and then uses a tree structure to split the CTUs recursively. A leaf node in the tree structure becomes a coding unit (CU), which is a basic unit of encoding.

A tree structure for use may be a QuadTree (QT) in which an upper node (or parent node) is split into four equally sized lower nodes (or child nodes), a BinaryTree (BT) in which an upper node is split into two lower nodes, a TernaryTree (TT) in which an upper node is split into three lower nodes in a size ratio of 1:2:1, or a mixture of two or more of the QT structure, BT structure, and TT structure. For example, a QuadTree plus BinaryTree (QTBT) structure may be used, or a QuadTree plus BinaryTree TernaryTree (QTBTTT) structure may be used. Here, BTTT may be collectively referred to as a Multiple-Type Tree (MTT).

Figure 2:
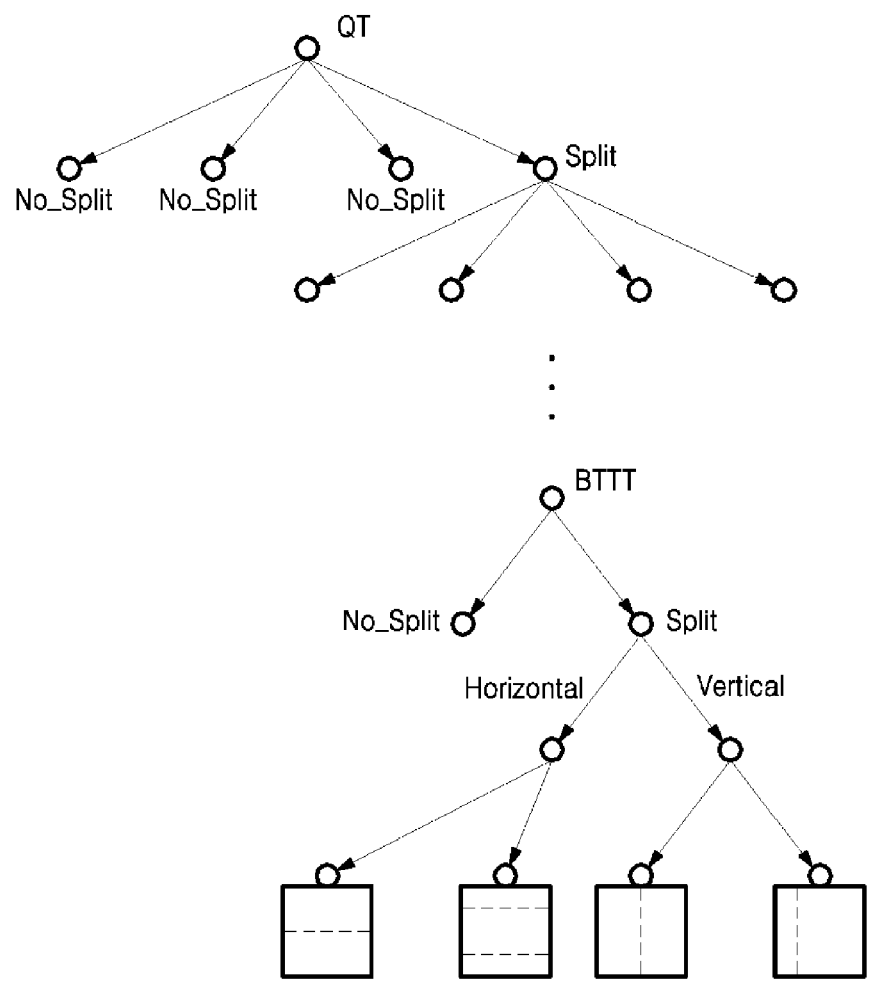
FIG. 2 is a diagram for explaining a method of splitting a block by using a QTBTTT structure.

FIG. 2 shows a QTBTTT split tree structure. As shown in FIG. 2, the CTU may be first split into a QT structure. The quadtree splitting may be repeated until the size of a splitting block reaches the minimum block size (MinQTSize) of a leaf node allowed in QT. A first flag (QT_split_flag) indicating whether each node of the QT structure is split into four nodes of a lower layer is encoded by the entropy encoding unit 155 and signaled to the video decoding apparatus. When the leaf node of the QT is not larger than the maximum block size (MaxBTSize) of the root node allowed in the BT, it may be further split into any one or more of the BT structure or the TT structure. In the BT structure and/or the TT structure, there may be a plurality of split directions. For example, there may be two directions in which the block of the relevant node is split horizontally and vertically. As shown in FIG. 2, when MTT splitting starts, a second flag (mtt_split_flag) indicating whether the nodes are split, and if yes, a further flag indicating split directions (vertical or horizontal) and/or a flag indicating partition or split type (binary or ternary) is encoded by the entropy encoding unit 155 and signaled to the video decoding apparatus.

Alternatively, before encoding the first flag (QT_split_flag) indicating whether each node is split into four nodes of a lower layer, a CU split flag (split_cu_flag) might be encoded indicating whether the node is split or not. When the CU split flag (split_cu_flag) value indicates that it was not split, the block of that node becomes a leaf node in the split tree structure and turns into a coding unit (CU), which is a basic unit of coding. When the CU split flag (split_cu_flag) value indicates that the node was split, the video encoding apparatus starts encoding from the first flag in an above-described manner.

As another example of the tree structure, when QTBT is used, there may be two types of partition including a type that horizontally splits the block of the relevant node into two equally sized blocks (i.e., symmetric horizontal partition) and a type that splits the same vertically (i.e., symmetric vertical partition). Encoded by the entropy encoding unit 155 and transmitted to the video decoding apparatus are a split flag (split_flag) indicating whether each node of the BT structure is split into blocks of a lower layer and partition type information indicating its partition type. Meanwhile, there may be a further type in which the block of the relevant node is split into two asymmetrically formed blocks. The asymmetric form may include a form of the block of the relevant node being split into two rectangular blocks having a size ratio of 1:3 or a form of the block of the relevant node being split in a diagonal direction.

A CU may have various sizes depending on the QTBT or QTBTTT split of the CTU. Hereinafter, a block corresponding to a CU to be encoded or decoded (i.e., a leaf node of QTBTTT) is referred to as a 'current block'. With QTBTTT splitting employed, the shape of the current block may be not only a square but also a rectangle.

The prediction unit 120 predicts the current block to generate a prediction block. The prediction unit 120 includes an intra prediction unit 122 and an inter prediction unit 124.

In general, the current blocks in a picture may each be predictively coded. Prediction of the current block may be generally performed using an intra prediction technique or inter prediction technique, wherein the intra prediction technique uses data from the very picture containing the current block and the inter prediction technique uses data from the preceding picture coded before the picture containing the current block. Inter prediction includes both unidirectional prediction and bidirectional prediction.

Figure 3A:
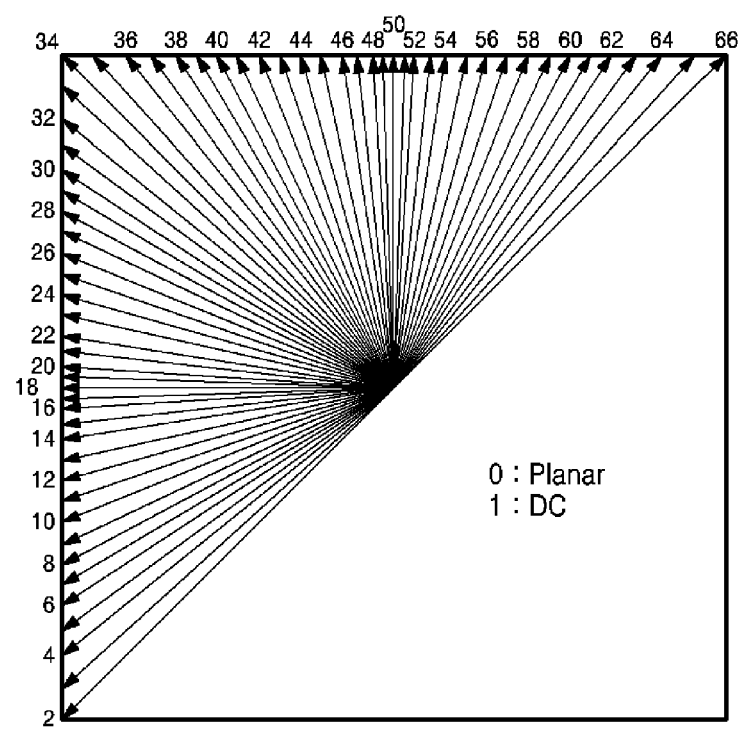
FIG. 3A is a diagram illustrating a plurality of intra prediction modes.

The intra prediction unit 122 predicts pixels in the current block by using the peripheral pixels (reference pixels) located around the current block in the current picture. Different prediction directions present multiple corresponding intra prediction modes. For example, as shown in FIG. 3A, the multiple intra prediction modes may include 2 non-directional modes including a planar mode and a DC mode and 65 directional modes. The respective prediction modes provide different corresponding definitions of the neighboring pixels and the calculation formula to be used.

Figure 3B:
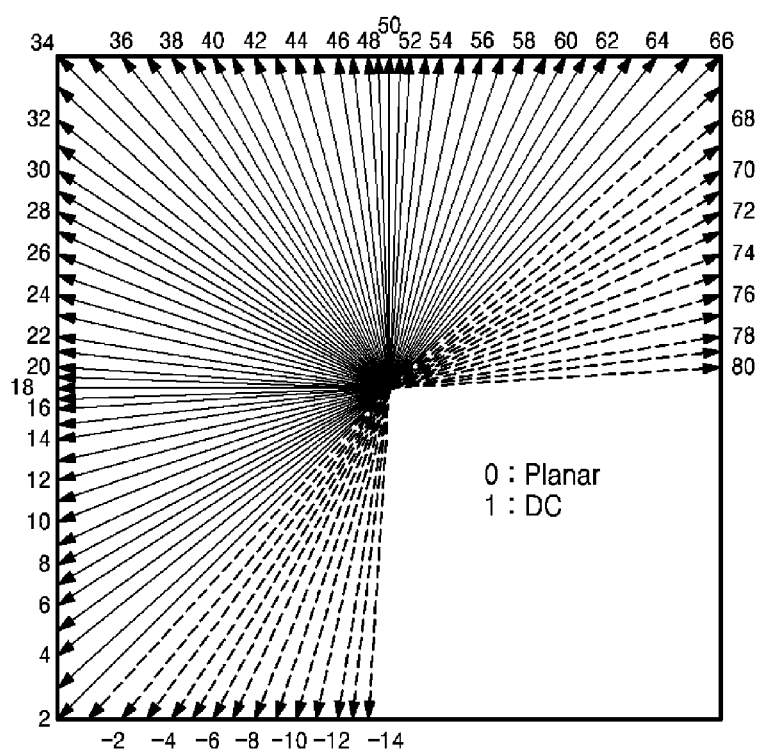
FIG. 3B is a diagram illustrating a plurality of intra prediction modes including wide-angle intra prediction modes.

For efficient directional prediction of a rectangular-shaped current block, additional modes for use may be directional modes shown in FIG. 3B by dotted arrows of intra prediction modes at Nos. 67 to 80 and No. −1 to No. −14. These may be referred to as "wide-angle intra-prediction modes". Arrows in FIG. 3B indicate corresponding reference samples used for prediction, not prediction directions. The prediction direction is opposite to the direction indicated by the arrow. The wide-angle intra prediction modes are modes for when the current block is rectangular to perform prediction of a specific directional mode in the reverse direction without additional bit transmission. In this case, among the wide-angle intra prediction modes, some wide-angle intra prediction modes available for use in the current block may be determined by the ratio of the width to the height of the rectangular current block. For example, the wide-angle intra prediction modes that have an angle smaller than 45 degrees (intra prediction modes at Nos. 67 to 80) are available for use in the current block when having a rectangular shape with a height smaller than the width. The wide-angle intra prediction modes having an angle of −135 degrees or greater (intra prediction modes at Nos. −1 to −14) are available for use in the current block when having a rectangular shape with a height greater than a width.

The intra prediction unit 122 may determine an intra prediction mode to be used for encoding the current block. In some examples, the intra prediction unit 122 may encode the current block by using several intra prediction modes and select an appropriate intra prediction mode to use from tested modes. For example, the intra prediction unit 122 may calculate rate-distortion values through rate-distortion analysis of several tested intra prediction modes and select an intra prediction mode that has the best rate-distortion characteristics among the tested modes.

The intra prediction unit 122 selects one intra prediction mode from among a plurality of intra prediction modes and predicts the current block by using at least one neighboring pixel (reference pixel) determined according to the selected intra prediction mode and calculation formula. Information on the selected intra prediction mode is encoded by the entropy encoding unit 155 and transmitted to the video decoding apparatus.

The inter prediction unit 124 generates a prediction block for the current block through a motion compensation process. The inter prediction unit 124 searches for a block most similar to the current block in the coded and decoded reference picture before the current picture, and generates a prediction block of the current block by using the searched block. Then, the inter prediction unit 124 generates a motion vector corresponding to the displacement between the current block in the current picture and the prediction block in a reference picture. In general, motion estimation is performed on a luma component, and a motion vector calculated based on the luma component is used for both the luma component and the chroma component. Motion information including information on the reference picture and information on the motion vector used to predict the current block is encoded by the entropy encoding unit 155 and transmitted to the video decoding apparatus.

The subtractor 130 generates a residual block by subtracting, from the current block, the prediction block generated by the intra prediction unit 122 or the inter prediction unit 124.

The transform unit 140 splits the residual block into one or more transform blocks, applies a transform to the one or more transform blocks, and thereby transforms the residual values of the transform blocks from the pixel domain to the frequency domain. In the frequency domain, the transformed blocks are referred to as coefficient blocks containing one or more transform coefficient values. A two-dimensional transform kernel may be used for the transform, and a one-dimensional transform kernel may be used for each of the horizontal transform and the vertical direction transform. The transform kernels may be based on a discrete cosine transform (DCT), a discrete sine transform (DST), or the like.

The transform unit 140 may transform the residual signals in the residual block by using the whole size of the residual block as a transform unit. Additionally, the transform unit 140 may split the residual block into two subblocks in the horizontal or vertical direction, and perform the transform on only one of the two subblocks, as will be described below with reference to FIGS. 5A to 5D. Accordingly, the size of the transform block may be different from the size of the residual block (and thus the prediction block size). Non-zero residual sample values may not exist or may be very sparse in a subblock on which no transform is performed. No signaling is done for residual samples of a subblock on which on transform is performed, and they may all be regarded as "0" by the video decoding apparatus. Several partition types may exist depending on split directions and split ratios. The transform unit 140 provides the entropy encoding unit 155 with information on the coding mode (or transform mode) of the residual block, such as information indicating whether the transformed is the residual block or the residual subblock, information indicating the partition type selected for splitting the residual block into subblocks, and information for identifying the subblock where the transform is performed, etc. The entropy encoding unit 155 may encode the information on the coding mode (or transform mode) of the residual block.

The quantization unit 145 quantizes the transform coefficients outputted from the transform unit 140 and outputs the quantized transform coefficients to the entropy encoding unit 155. The quantization unit 145 may directly quantize a relevant residual block for a certain block or frame without transform.

The rearrangement unit 150 may rearrange the coefficient values on the quantized residual values. The rearrangement unit 150 may use coefficient scanning for changing the two-dimensional coefficient array into a one-dimensional coefficient sequence. For example, the rearrangement unit 150 may scan over DC coefficients to coefficients in a high-frequency region through a zig-zag scan or a diagonal scan to output a one-dimensional coefficient sequence. Depending on the size of the transform unit and the intra prediction mode, the zig-zag scan used may be replaced by a vertical scan for scanning the two-dimensional coefficient array in a column direction and a horizontal scan for scanning the two-dimensional block shape coefficients in a row direction. In other words, a scanning method to be used may be determined among a zig-zag scan, a diagonal scan, a vertical scan, and a horizontal scan according to the size of the transform unit and the intra prediction mode.

The entropy encoding unit 155 uses various encoding methods such as Context-based Adaptive Binary Arithmetic Code (CABAC), Exponential Golomb, and the like for encoding a sequence of the one-dimensional quantized transform coefficients outputted from the rearrangement unit 150 to generate a bitstream.

Additionally, the entropy encoding unit 155 encodes information on block partition, such as CTU size, CU split flag, QT split flag, MTT split type, and MTT split direction for allowing the video decoding device to split the block in the same way as the video encoding device. Additionally, the entropy encoding unit 155 encodes information on a prediction type indicating whether the current block is encoded by intra prediction or inter prediction and decodes, depending on the prediction type, intra prediction information, i.e., information on intra prediction mode or inter prediction information, i.e., information on reference pictures and motion vectors.

The inverse quantization unit 160 inverse quantizes the quantized transform coefficients outputted from the quantization unit 145 to generate transform coefficients. The inverse transform unit 165 transforms the transform coefficients outputted from the inverse quantization unit 160 from the frequency domain to the spatial domain to reconstruct the residual block.

The addition unit 170 adds up the reconstructed residual block and the prediction block generated by the prediction unit 120 to reconstruct the current block. Pixels in the reconstructed current block are used as reference pixels when intra-predicting the next block.

The filter unit 180 performs filtering on the reconstructed pixels to reduce blocking artifacts, ringing artifacts, blurring artifacts, etc. generated due to block-based prediction and transform/quantization. The filter unit 180 may include a deblocking filter 182 and a sample adaptive offset (SAO) filter 184.

The deblocking filter 180 filters the boundary between the reconstructed blocks to remove a blocking artifact caused by block-by-block encoding/decoding, and the SAO filter 184 performs additional filtering on the deblocking filtered image. The SAO filter 184 is a filter used to compensate for a difference between a reconstructed pixel and an original pixel caused by lossy coding.

The reconstructed block is filtered through the deblocking filter 182 and the SAO filter 184 and stored in the memory 190. When all blocks in one picture are reconstructed, the reconstructed picture may be used as a reference picture for inter-prediction of blocks in a coming picture to be encoded.

Figure 4:
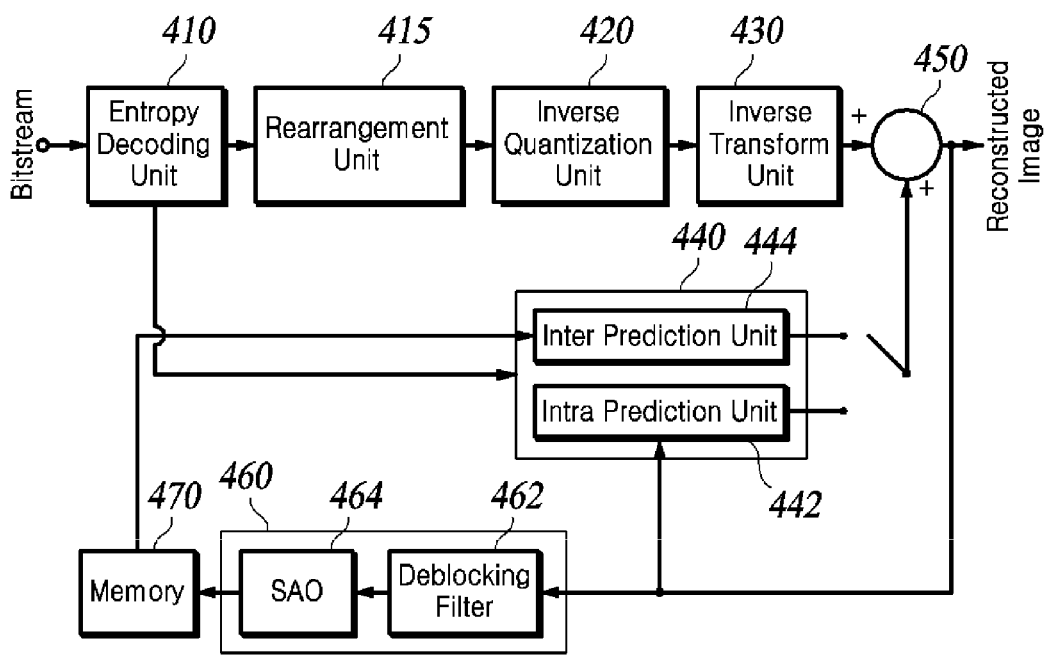
FIG. 4 is a block diagram illustrating a video decoding apparatus capable of implementing the techniques of the present disclosure.

FIG. 4 is a functional block diagram illustrating a video decoding apparatus capable of implementing the techniques of the present disclosure. Hereinafter, the video decoding apparatus and sub-components of the apparatus will be described referring to FIG. 4.

The video decoding apparatus may be configured including an entropy decoding unit 410, a rearrangement unit 415, an inverse quantization unit 420, an inverse transform unit 430, a prediction unit 440, an adder 450, a filter unit 460, and a memory 470.

As with the video encoding apparatus of FIG. 1, the respective components of the video decoding apparatus may be implemented as hardware or software, or hardware and software combined. Additionally, the function of each component may be implemented by software and the function by software for each component may be implemented to be executed by a microprocessor.

The entropy decoding unit 410 decodes the bitstream generated by the video encoding apparatus and extracts information on block partition to determine the current block to be decoded, and extracts prediction information required to reconstruct the current block and information on residual signal, etc.

The entropy decoding unit 410 extracts information on the CTU size from a sequence parameter set (SPS) or a picture parameter set (PPS), determines the size of the CTU, and splits the picture into CTUs of the determined size. Then, the entropy decoding unit 410 determines the CTU as the highest layer, i.e., the root node of the tree structure, and extracts the split information on the CTU and thereby splits the CTU by using the tree structure.

For example, when splitting the CTU by using the QTBTTT structure, a first flag (QT_split_flag) related to QT splitting is first extracted and each node is split into four nodes of a lower layer. For the node corresponding to the leaf node of QT, the entropy decoding unit 410 extracts the second flag (MTT_split_flag) related to the partition of MTT and information of the split direction (vertical/horizontal) and/or split type (binary/ternary) to split that leaf node into an MTT structure. This allows the respective nodes below the leaf node of QT to be recursively split into a BT or TT structure.

As another example, when splitting the CTU by using the QTBTTT structure, the entropy decoding unit 410 may first extract a CU split flag (split_cu_flag) indicating whether a CU is split, and upon splitting the relevant block, it may also extract a first flag (QT_split_flag). In the splitting process, each node may have zero or more recursive QT splits followed by zero or more recursive MTT splits. For example, the CTU may immediately enter MTT split, or conversely, have multiple QT splits alone.

As yet another example, when splitting the CTU by using the QTBT structure, the entropy decoding unit 410 extracts a first flag (QT_split_flag) related to QT splitting to split each node into four nodes of a lower layer. And, for a node corresponding to a leaf node of QT, the entropy decoding unit 410 extracts a split flag (split_flag) indicating whether that node is or is not further split into BT and split direction information.

Meanwhile, when the entropy decoding unit 410 determines the current block to be decoded through the tree-structure splitting, it extracts information on a prediction type indicating whether the current block was intra-predicted or inter-predicted. When the prediction type information indicates intra prediction, the entropy decoding unit 410 extracts a syntax element for intra prediction information (intra prediction mode) of the current block. When the prediction type information indicates inter prediction, the entropy decoding unit 410 extracts a syntax element for the inter prediction information, that is, information indicating a motion vector and a reference picture referenced by the motion vector.

Meanwhile, the entropy decoding unit 410 extracts, from the bitstream, information on the coding mode of the residual block, e.g., information on whether the residual block was encoded or the subblocks alone of the residual block were coded, information indicating the selected partition type for splitting the residual block into subblocks, information identifying the encoded residual subblocks, quantization parameters, etc. Further, the entropy decoding unit 410 extracts information on the quantized transform coefficients of the current block as information on the residual signal.

The rearrangement unit 415 re-sequences, in a reverse sequence of the coefficient scanning sequence performed by the video encoding apparatus, the one-dimensional quantized transform coefficients that are entropy-decoded by the entropy decoding unit 410 into a two-dimensional coefficient array, i.e. block.

The inverse quantization unit 420 inverse quantizes the quantized transform coefficients. The inverse transform unit 430 inverse transform, based on information on the coding mode of the residual block, the inverse quantized transform coefficients from the frequency domain to the spatial domain to reconstruct the residual signals and thereby generate a reconstructed residual block of the current block.

The inverse transform unit 430 is responsive to when the information on the coding mode of the residual block indicates that the residual block of the current block was encoded in the video encoding apparatus for performing an inverse transform on the inverse quantized transform coefficients by using the size of the current block (thus, the size of the residual block to be reconstructed) as a transform unit to generate a reconstructed residual block of the current block.

Additionally, the inverse transform unit 430 is responsive to when the information on the coding mode of the residual block indicates that a single subblock alone of the residual block was encoded in the video encoding apparatus for performing inverse transform on the inverse quantized transform coefficients by using the size of the transformed subblock as a transform unit to reconstruct residual signals of the transformed subblock while filling the residual signals of the untransformed subblock with "0" values, thereby generating a reconstructed residual block of the current block.

The prediction unit 440 may include an intra prediction unit 442 and an inter prediction unit 444. The intra prediction unit 442 is activated when the prediction type of the current block is intra prediction, and the inter prediction unit 444 is activated when the prediction type of the current block is inter prediction.

The intra prediction unit 442 determines, among a plurality of intra prediction modes, the intra prediction mode of the current block from the syntax element for the intra prediction mode extracted by the entropy decoding unit 410, and according to the determined intra prediction mode, it predicts the current block by using neighboring reference pixels of the current block.

The inter prediction unit 444 utilizes the syntax element for the intra prediction mode extracted by the entropy decoding unit 410 to determine a motion vector of the current block and a reference picture referenced by the motion vector, and it utilizes the motion vector and the reference picture as determined to predict the current block.

The adder 450 adds up the residual block outputted from the inverse transform unit and the prediction block outputted from the inter prediction unit or the intra prediction unit to reconstruct the current block. Pixels in the reconstructed current block are used as reference pixels when intra-predicting a coming block to be decoded.

The filter unit 460 may include a deblocking filter 462 and an SAO filter 464. The deblocking filter 462 deblocks and filters the boundary between reconstructed blocks to remove a blocking artifact caused by block-by-block decoding. The SAO filter 464 performs additional filtering on the reconstructed block after deblocking filtering to compensate for the difference between the reconstructed pixel and the original pixel caused by lossy coding. The reconstructed block is filtered through the deblocking filter 462 and the SAO filter 464 and stored in the memory 470. When all blocks in one picture are reconstructed, the reconstructed picture is used as a reference picture for inter-prediction of coming blocks within a picture to be encoded.

The techniques of the embodiments illustrated herein generally relate to inter-prediction coding, i.e., encoding and decoding a current block. To efficiently encode a residual block obtained according to block-based motion compensation, the video encoding apparatus may divide the residual block into two residual subblocks in a horizontal or vertical direction and encode one residual subblock alone between the two residual subblocks. In other words, the transform and quantization process may be applied to just one residual subblock. The other non-encoded subblock has its residual values regarded as '0' or ignored. Such a coding tool can be effective in encoding the residual block when some region thereof presents no or little residual value.

The video encoding apparatus may select optimal one of a first coding mode and a second coding mode, wherein the first coding mode encodes the residual block thus transforming the residual signals in the residual block in a transform unit that is equal in size to the prediction block, and the second coding mode splits the residual block into two subblocks in a horizontal or vertical direction and encodes one subblock alone thus transforming the residual signals in the residual block in a transform unit that is different in size to the prediction block.

The following details the second mode related to the coding of the residual block. The following description mainly focuses on the decoding technology, in particular, the operation of the video decoding apparatus, and it will keep the encoding technology concise because the latter is the reverse of the comprehensively described decoding technology. Additionally, the terms "subblock(s) of residual block" and "residual subblock(s)" may be used interchangeably.

1. Partition Type and Transform Position

FIGS. 5A to 5D illustrate various split or partition types of the residual block and subblocks to be coded (and thus transformed). The residual block may be split into two subblocks. In the illustrated residual blocks 510 to 580, the subblocks that undergo transform are shaded and labeled with "A." A subblock located on the left or upper side in the residual block may be expressed as being located at "position 0" in the residual block, and a subblock located at the right or lower side in the residual block may be expressed as being located at "position 1" within the residual block. A position of a subblock in a residual block on which the transform is performed may be referred to as a "transform position." Therefore, the transform position indicated by "position 0" may represent the transform as performed on a subblock located at the left or upper side in the residual block, the transform position indicated by "position 1" may represent the transform as performed on a subblock located at the right or lower side in the residual block.

Various partition types may be considered according to the split direction and split ratio. Block partition types to be considered include a first type that splits symmetrically in the horizontal direction, a second type that splits symmetrically in the vertical direction, and a third type that splits in the horizontal direction asymmetrically (e.g., in a ratio of 1:3 or 3:1), and a fourth type that splits in the vertical direction asymmetrically (e.g., in a ratio of 1:3 or 3:1).

The block 510 is vertically split into a left subblock and a right subblock, and the transform is not performed on the right subblock at position 1 but is performed on the left subblock at position 0. The block 520 is vertically split into left and right subblocks, and transform is not performed on the left subblock but is performed on the right subblock at position 1. The block 530 is split into upper and lower subblocks in the horizontal direction, and transform is performed on the upper subblock at position 0 rather than the lower subblock. The block 540 is split into two subblocks in the horizontal direction, and transform is performed on the lower subblock at position 1 rather than the upper subblock.

The block 550 is vertically split into a left subblock and a right subblock having a ratio of 1:3, and the transform is not performed on the right subblock at position 1 but is performed on the left subblock at position 0. The block 560 is vertically split into left and right subblocks with a ratio of 3:1, and transform is not performed on the left subblock but on the right subblock at position 1. The block 570 is horizontally split into upper and lower subblocks having a ratio of 1:3, and transform is performed on the upper subblock at position 0 rather than the lower subblock. The block 580 is split into two subblocks having a ratio of 3:1 in the horizontal direction, and transform is performed on the lower subblock at position 1 rather than the upper subblock.

Figure 5A:
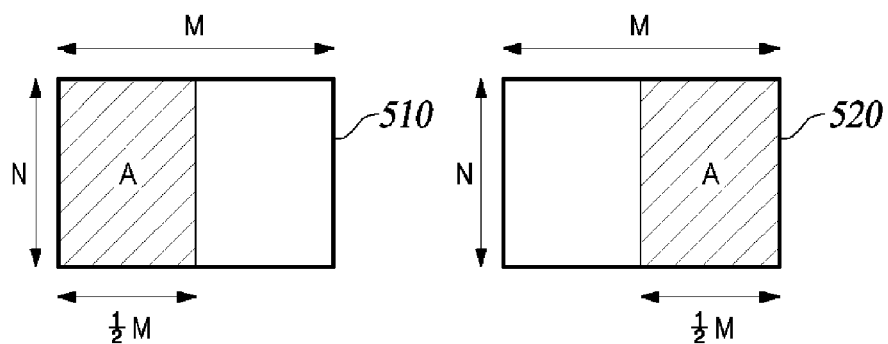
FIGS. 5A to 5D illustrate various partition types of a residual block and subblocks to be coded.
Figure 5B:
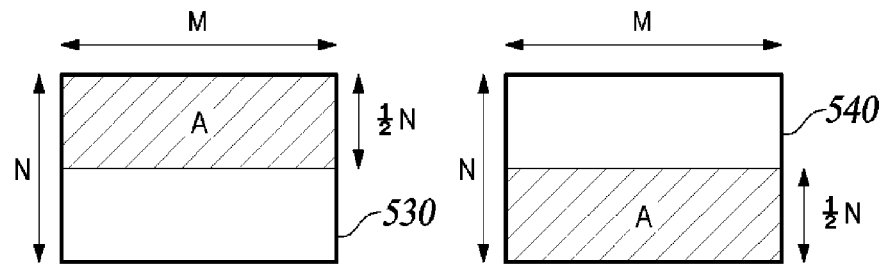
Figure 5C:
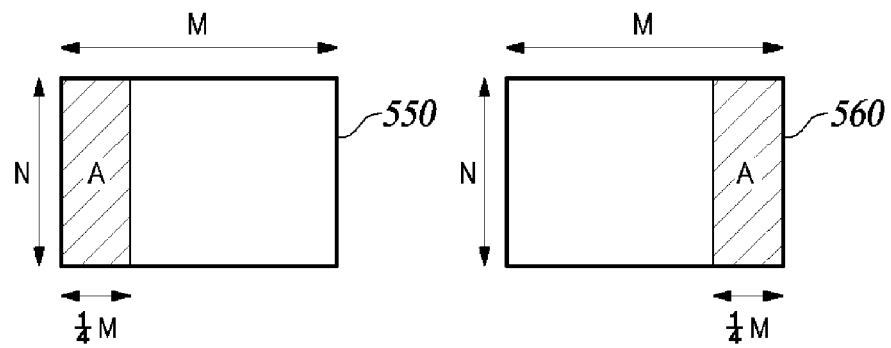
Figure 5D:
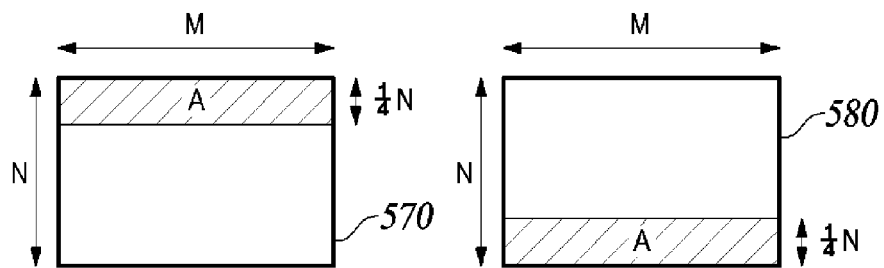

As with the blocks 550 to 580 illustrated in FIGS. 5C and 5D, when the residual block is split asymmetrically (e.g., in a ratio of 1:3 or 3:1), the transform may be set to be performed on the smaller subblock by default.

Available split ratios and split directions may be limited according to the size of the residual block to provide 4 pixels or more for the height or width of the subblock to undergo the transform. For example, the first type of horizontally symmetrical splitting may be allowed for residual blocks having a width of 8 pixels or more, and the second type of vertically symmetrical splitting may be allowed for residual blocks having a height of 8 pixels or more. Similarly, the third type and the fourth type that provide horizontally or vertically asymmetrical splitting may be allowed for residual blocks having a width or height of 16 pixels or more.

2. Selection of Transform Kernel

Depending on the partition direction (horizontal or vertical) of the residual block and its transform position, i.e., the position of the transformed subblock, transform kernels (horTransform and verTransform) in horizontal and vertical directions may be chosen for use to the subblock to be transformed.

When vertical partition is applied to the residual block, the kernel to be used for the transform of the subblock may be implicitly derived as follows. As with the blocks 510 and 550, when the subblock being transformed is in position 0, then (horTransform, verTransform)=(DCT-8, DST-7). As with the blocks 520 and 560, when the subblock being transformed is in position 1, then (horTransform, verTransform)=(DST-7, DST-7).

When horizontal partition is applied to the residual block, the kernel to be used for the transform of the subblock may be implicitly derived as follows. As with the blocks 530 and 570, when the subblock being transformed is in position 0, then (horTransform, verTransform)=(DCT-7, DST-8). As with the blocks 540 and 580, when the subblock being transformed is in position 1, then (horTransform, verTransform)=(DST-7, DST-7).

When one of the residual subblocks is greater than 32 pixels, the DCT-2 kernel may be applied for both the horizontal and vertical directions. Additionally, for the residual block of the chroma component, the DCT-2 kernel may be always applied to the transform of the residual subblock, regardless of the split direction (horizontal or vertical) of the residual block and its transform position, i.e., the position of the transformed subblock. Some cases may explicitly signal information identifying transform kernels used for transform in the horizontal and vertical directions.

3. Signaling of Residual Coding Mode

When the current block is inter prediction-encoded and the relevant residual block has at least one non-zero coefficient, a first flag may be explicitly signaled for indicating whether the relevant residual block of the current block is transformed or just one subblock of the residual block is encoded.

Accordingly, the video decoding apparatus at the time of reconstructing the residual block of the inter prediction-encoded current block may decode the first flag from the bitstream to determine whether the video encoding apparatus have split the residual block into two subblocks and encoded one subblock alone between the two subblocks.

Some embodiments may skip the signaling of the first flag depending on the width or height of the current block or depending on the product of the width and the height, the ratio of the width to the height, and the greater of the width and the height. For example, when the width and height of the current block are both less than 8 pixels, the video decoding apparatus may skip decoding of the first flag and infer that the whole residual block of the current block has been transformed.

When just one subblock of the residual block is encoded, a partition type and a transform position of the residual block may be additionally signaled. The video encoding apparatus may be provided with information on the partition type and the transform position in various ways. For example, one syntax element may be used to represent the partition type of the residual block, or two flags may be used to represent a split ratio and a split direction. Additionally, one flag may be used to represent the transform position that is the position of the subblock being transformed. An example case may set a flag indicating the transform position to a value of "0" when a transform is applied to a subblock located on the left or upper side in the residual block, and set the flag indicating the transform position to a value of "1" when the transform is applied to a subblock located on the right or lower side in the residual block.

The residual block when split in a ratio of 1:3 or 3:1 may add a constraint that the transform is performed at the smaller subblock invariably, which allows exemption of signaling of a flag indicating a transform position.

Additionally, depending on the width and height of the residual block or depending on the product of the width and the height, the ratio of the width to the height, and the greater of the width and the height, some partition type or split direction and/or split ratio may be limited from being used, which allows exemption of signaling of syntax elements representing the same partition type or split direction and/or split ratio. As an example, when the width and the height of the residual block are both smaller than 16 pixels, the residual block may not be allowed to be split "in a 1:3 ratio or a 3:1 ratio". Accordingly, the video decoding apparatus may be responsive to the residual block when having the width and height of smaller than 16 pixels for inferring the split ratio to be 1:1 without decoding the flag indicating the split ratio. As another example, when the width (or height) of the residual block is less than 8 pixels, the residual block may not be allowed to be split in the vertical direction (or horizontal direction). Accordingly, the video decoding apparatus may be responsive to the residual block when having a width of smaller than 8 pixels for inferring that the residual block is split in the horizontal direction without decoding flags indicating the split direction. Similarly, the video decoding apparatus may be responsive to the residual block when having a height of less than 8 pixels for inferring that splitting is performed in the vertical direction. Yet another example may be responsive to when the width is greater than the height for inferring that splitting is performed in the vertical direction, and when the height is greater than the width for inferring that splitting is performed in the horizontal direction.

A luma component-related residual block may have its one residual subblock exclusively encoded, then the corresponding chroma component-related residual block may likewise have its one residual subblock exclusively encoded. Accordingly, the first flag signaled at the CU-level may be shared between the luma-component residual block and chroma-component residual blocks.

The same residual coding mode selected for the luma-component residual block may be applied to the chroma-component residual block colocated with the luma-component residual block. In other words, when the luma-component residual block has just one subblock encoded, the chroma-component residual block may likewise have just one subblock encoded. In this case, information about the partition type of the residual block and the position of the subblock subject to encoding may be shared between the luma block and the chroma blocks.

In at least one embodiment of a single tree structure, the same residual coding mode may be applied to the luma component and the chroma component, and the same information about the split direction determined for the luma-component residual block and the position of the subblock subject to encoding may be applied to the chroma-component residual blocks. In another example where just one subblock of the chroma-component residual block is encoded, when just one subblock of the colocated luma-component residual block is likewise encoded, the same information about the split direction determined for the luma-component residual block and the position of the subblock subject to encoding may be applied to the chroma-component residual blocks.

4. Residual Block Reconstruction

The video decoding apparatus may determine, based on the partition type and the transform position, the position of a subblock in a residual block where to decode the relevant transform coefficient information from the bitstream as well as the subblock size. The video decoding apparatus may decode the transform coefficient information from the bitstream to reconstruct transform coefficients of a subblock corresponding to the transform position. The video decoding apparatus applies an inverse quantization/inverse transform process to the reconstructed transform coefficients to generate residual signals of the subblock corresponding to the transform position, and sets all residual signals of the other subblock corresponding to a non-transform position to "0," thereby reconstructing the residual block of the current block.

Similarly, the video encoding apparatus performs transform and quantization on the residual subblock corresponding to the transform position, entropy-codes the quantized transform coefficients, and applies an inverse quantization/inverse transform process to the quantized transform coefficients to reconstruct the residual subblock corresponding to the transform position, and sets all residual signals of the other subblock corresponding to a non-transform position to "0," thereby reconstructing the residual block of the current block.

5. Calculation of Quantization Parameters

The video encoding apparatus may determine a quantization parameter (QP) value for the current block (CU) and determine, based on the QP value and a QP prediction value, a differential quantization parameter (Delta QP or DQP) value for the current block. The video encoding apparatus may be configured to signal the DQP value and quantize the current block by using the determined QP value. The video encoding apparatus may adjust the QP value of the current block and thereby adjust the degree of quantization applied to coefficient blocks related to the current block.

DQP is defined as the difference between the current QP, i.e., the actual QP used in the current block and the predicted value of the current QP or the QP prediction value. Based on the signaled DQP, the corresponding current QP value may be reconstructed by adding the DQP to the QP prediction value. In particular, the video encoding apparatus renders the DQP to be calculated by subtracting the QP prediction value from the actual QP of the current block, and the video decoding apparatus renders the actual QP of the current block to be reconstructed by adding the received DQP to the QP prediction value.

In some embodiments, a mean value of actual QP values for an upper block and a left block with respect to the current block may be determined as the QP prediction value of the current block. In some other embodiments, representative values (e.g., mean, median, etc.) of actual QP values for the left block, upper left block, and upper block about the current block may be determined as the QP prediction value of the current block.

Some embodiments encode just one subblock of a relevant residual block of the current block, wherein partition information of the residual block, a split shape, or a position of a subblock for encoding, etc. are used as bases for selecting neighboring blocks to be referred to. Then, actual QP values for the selecting neighboring blocks may be used as the QP prediction value of the current block, or the actual QP values of the selected neighboring block(s) may be used as bases for deriving the QP prediction value of the current block.

Figure 6:
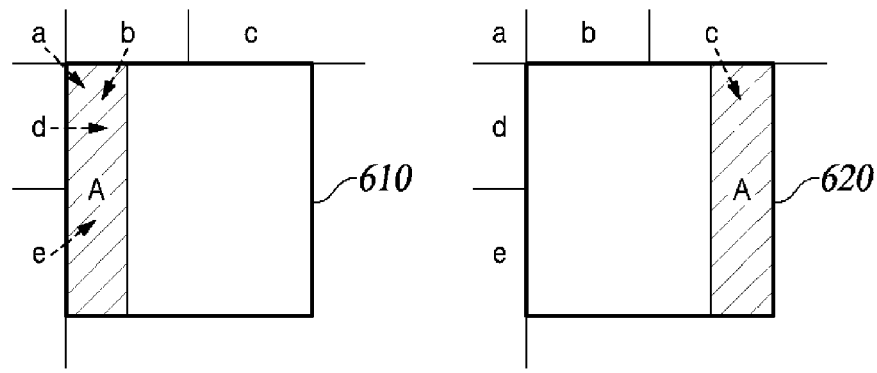
FIG. 6 is a diagram for explaining a case of encoding one subblock alone in a relevant residual block of a current block, illustrating positions of the neighboring blocks to be referred to for predicting a quantization parameter (QP).

FIG. 6 is a diagram for explaining a case of encoding one subblock alone in a relevant residual block of a current block, illustrating positions of the neighboring blocks to be referred to for predicting a quantization parameter (QP).

When a residual block 610 is vertically split and the residual signal exists only in the left subblock, that is, the left subblock alone is coded, at least one of the QP prediction values of neighboring blocks "a, b, d, e" adjacent to the left subblock may be used as a basis for calculating the QP prediction value of the current block. For example, the QP prediction value of the current block may be calculated based on the mean value of the QP values of block "a" and block "b.".

When a residual block 620 is vertically split and the residual signal exists only in the right subblock, that is the right subblock alone is coded, the QP value of a block "c," which is a neighboring block adjacent to the right subblock may be determined as the QP prediction value of the current block.

Figure 7:
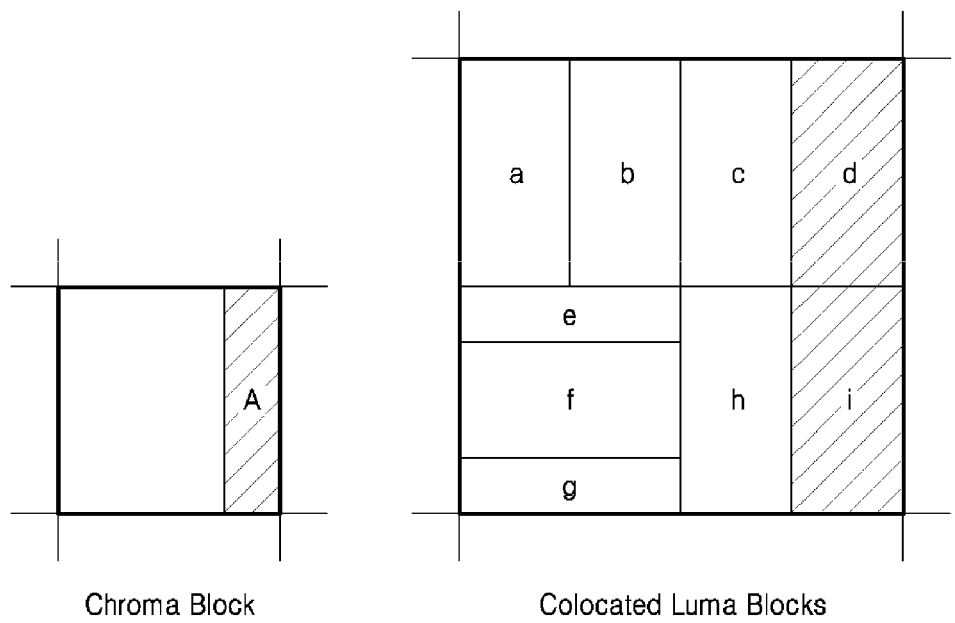
FIG. 7 is a diagram of a chroma block and at least one luma block that is colocated with the chroma block.

FIG. 7 is a diagram of a chroma block and at least one luma block that is colocated with the chroma block.

The QP value for the chroma block may be determined based on the determined QP value for the corresponding luma block(s). The QP prediction value of the chroma block may be determined based on the QP value of the luma block at the same location. As an example, the QP value of a luma block "a" located at the upper-left in the current block may be used as a QP prediction value for the chroma-component residual block. Alternatively, a usable QP prediction value of the chroma-component residual block may be a most frequent value, a maximum value, a minimum value, a mean value, or a median value among QP values of the luma blocks "a to i."

When encoding one subblock alone in the chroma-component residual block, a usable QP prediction value of the chroma block may be a QP value of the luma block selected based on a larger value (alternatively, a smaller value) among the split direction of the residual block, the position of the subblock for encoding, the size of the subblock, the horizontal-to-vertical ratio of the subblock, and the width or height of the subblock. In at least one embodiment, a usable QP prediction value of the chroma-component block is the QP value of one of block "d" and block "i," which are luma blocks corresponding to a subblock A being encoded in the chroma-component residual block, or a mean value of the QP values of block "d" and block "i."

6. In-Loop Filtering

The video encoding apparatus and the video decoding apparatus may perform in-loop filtering including deblocking filtering on the reconstructed current block, and store the filtered current block in a buffer (e.g., the memory 190 of FIG. 1 and the memory 470 of FIG. 4) for future use as a reference picture for inter prediction of the coming blocks in a picture to be coded.

The deblocking filter is applied to the pixels at the block boundary to mitigate blocking artifacts caused by the boundary between blocks in the reconstructed picture. The deblocking filtering is performed on a vertical boundary and a horizontal boundary. Filtering first performed on the vertical boundary may serve as an input for the horizontal boundary filtering to follow.

Figure 8:
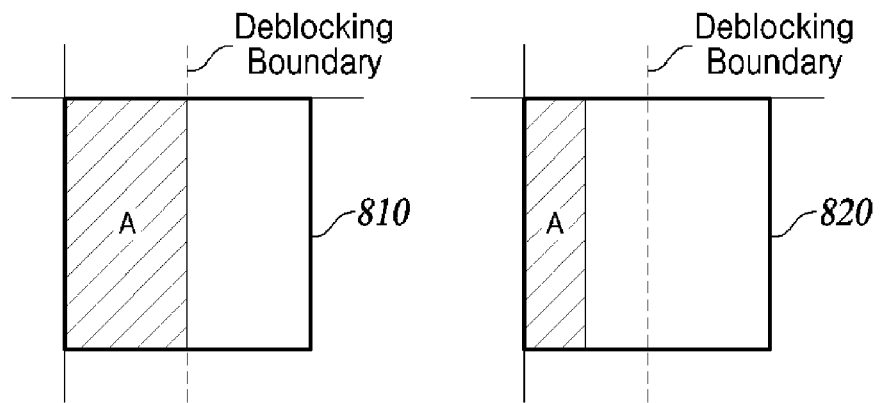
FIG. 8 is a diagram of reconstructed current blocks, illustrating their relevant residual blocks undergoing vertical partitions and transforms at their left subblocks to reveal their inter-subblock partition boundaries by a deblocking boundary.

FIG. 8 is a diagram of reconstructed current blocks (810, 820), illustrating their relevant residual blocks undergoing vertical partitions and transforms at their left subblocks (i.e., the transform position is 0) to show their inter-subblock partition boundaries and a deblocking boundary.

The video encoding apparatus and the video decoding apparatus may determine whether to or not to apply deblocking filtering on the current block based on whether the 4×4-unit (or 8×8-unit) deblocking boundary matches the boundary between subblocks of the residual block. For example, the video decoding apparatus may set a grid of N samples at regular intervals in horizontal and vertical directions and perform deblocking filtering only when the boundary between two subblocks in the current block coincides with the grid boundary. Accordingly, deblocking filtering may not be performed on boundaries between subblocks that do not coincide with the grid boundary. Here, N may be set to $2^n$ (n is a natural number). Alternatively, the video encoding apparatus and the video decoding apparatus may determine whether to apply deblocking filtering to the current block based on pixels included in several columns or rows included in the current block. A grid in different units may be used depending on whether the current block is a luma block or a chroma block. For example, a grid may be set in units of 4×4 for a luma block and a grid may be set in units of 8×8 for a chroma block.

Figure 9:
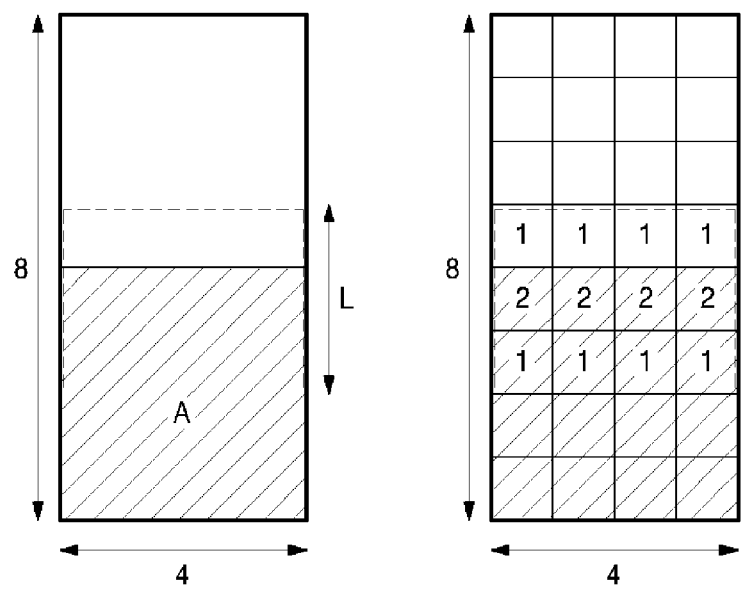
FIG. 9 is a diagram for explaining deblocking filtering performed on a boundary between residual subblocks at a residual signal level.

In some embodiments, deblocking filtering may be performed at the level of the reconstructed residual signal. FIG. 9 is a diagram for explaining deblocking filtering performed on a boundary between residual subblocks at a residual signal level. FIG. 9 illustrates a 4×8 residual block that undergoes a horizontal split and a transform at its lower 4×4 subblock (i.e., the transform position is 1). Once the residual signals corresponding to the lower subblock are reconstructed and the residual signals of the upper subblock are filled with "0" to complete a reconstructed residual block, deblocking filtering may be performed on the residual block. The embodiment of FIG. 9 illustrates a one-dimensional mean value filter having a parameter of [1 2 1] applied to the boundary between the two subblocks.

When applying a deblocking filter to the current block, a strong filter or a weak filter may be selected according to the required deblocking filtering strength. Further, one may consider using various customary filters in general image processing techniques, such as a mean value filter, a median value filter, and a bilateral filter.

As for filter selection, the video decoding apparatus may be informed by the video encoding apparatus on a filter to be used before selecting a filter for use in residual deblocking filtering. For example, an index of a filter to be used may be signaled among a plurality of predetermined filters. Alternatively, one predetermined filter may be used.

Once a filter is selected, the embodiments calculate filtering parameters relevant to the selected filter, in particular, parameters that determine the intensity of the filter and clipping values for changes in pixels, and based on the calculated filtering parameters, perform filtering on the residual sample boundary.

For the filter parameters, location information of neighboring coding unit such as a previous frame, neighboring block, neighboring tile group, neighboring tile, and the like may be signaled, and the filter parameters of the neighboring decoding unit corresponding to the location may be used for the current block as it is, or, the filter parameters for current block is reconstructed from the neighboring parameter values and further signaled difference values.

Figure 10:
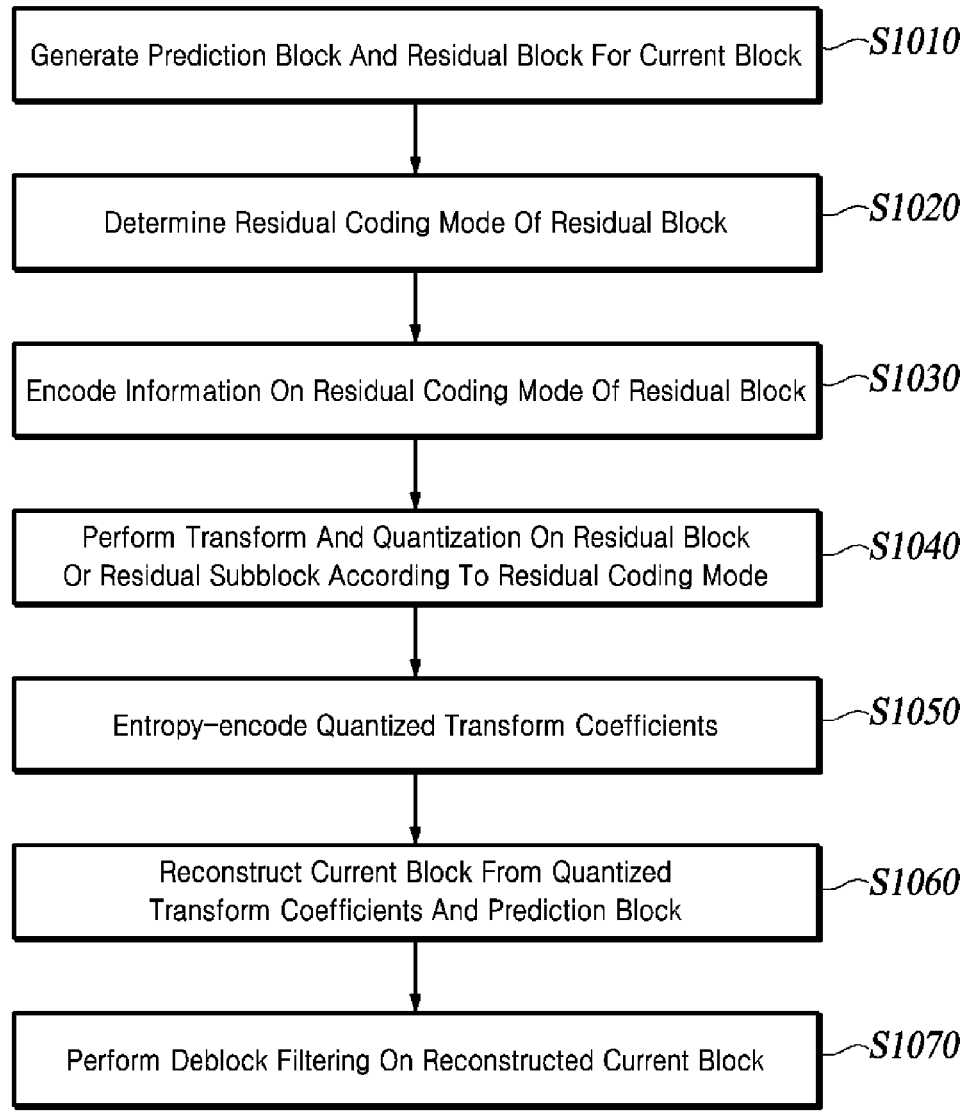
FIG. 10 is a flowchart of a method performed by a video encoding apparatus for inter prediction encoding a current block of a video according to at least one embodiment of the present disclosure.

FIG. 10 is a flowchart of a method performed by a video encoding apparatus for inter prediction encoding a current block of a video according to at least one embodiment of the present disclosure.

In Step S1010, the video encoding apparatus may generate a prediction block by inter-predicting the current block of the video data being encoded, and it may generate a residual block by subtracting the prediction block from the current block of the video data.

In Step S1020, the video encoding apparatus may determine a residual coding mode for the residual block of the current block. In particular, the video encoding apparatus may select whether to encode the residual block of the current block or to encode just one subblock that is a partial region of the residual block. This selection may be based on a rate-distortion test.

In Step S1030, the video encoding apparatus may encode information on the residual coding mode selected for a relevant residual block of the current block.

The residual coding mode information may include a first flag indicating whether the encoded is the residual block or one subblock alone of the residual block.

When just one subblock of the residual block is encoded, the video encoding apparatus may additionally encode information indicating a partition type for splitting the residual block into two subblocks. Various partition types may exist according to the split direction and split ratio. For example, the inter prediction encoding method may consider partition types for use including a first type that provides splitting horizontally symmetrically into two subblocks, a second type that provides splitting vertically symmetrically into two subblocks, a third type that provides splitting horizontally asymmetrically into two subblocks (e.g., with a ratio of 1:3 or 3:1), and a fourth type that provides splitting vertically asymmetrically into two subblocks (e.g., with a ratio of 1:3 or 3:1). One or more syntax elements may be used to signal a partition type (or a split direction and a split ratio) for a relevant residual block of the current block.

Depending on the width and height of the relevant residual block of the current block, and thus depending on the width and height of the prediction block, the video encoding apparatus may restrict the use of some split directions, split ratios, and/or partition types, and thus it can skip the signaling of syntax elements expressing the split direction, split ratio, and/or partition type depending on the width and height of the residual block.

In at least one embodiment, when the width and height of the residual block are both less than 16 pixels, the residual block may not be allowed to be split "in a 1:3 ratio or a 3:1 ratio". Accordingly, when the width and height of the residual block are smaller than 16 pixels, the split ratio may be inferred to be 1:1 by the video decoding apparatus, which may be accounted for by the video encoding apparatus for skipping the signaling of syntax elements (e.g., 1-bit flag) expressing the split direction. In another embodiment, when the width of the current block is less than 8 pixels, the vertical split of the current block may not be allowed. When the height of the current block is less than 8 pixels, the horizontal split of the current block may not be allowed. Accordingly, when the width (or height) of the residual block is smaller than 8 pixels, the current block is may be inferred to be split at a ratio of 1:1 in the vertical direction (or horizontal direction) by the video decoding apparatus, which allows the video encoding apparatus to skip the signaling of syntax elements (e.g., 1-bit flag) expressing the split direction.

Additionally, the video encoding apparatus may explicitly signal a flag for identifying a subblock to be encoded (and thus to undergo a transform) between two subblocks classified according to a partition type. In some embodiments, the video encoding apparatus may be responsive to when the partition type of the current block is the third type or the fourth type, i.e., when the current block is asymmetrically split in the horizontal or vertical direction, for immediately considering the smaller subblock is to be encoded between the two blocks while skipping signaling of a flag for identifying a subblock to be encoded.

In Steps S1040 to S1050, the video encoding apparatus encodes the residual block or one subblock of the residual block according to the residual coding mode selected for the relevant residual block of the current block. When it is selected to encode the residual block, the video encoding apparatus may perform transform and quantization on the residual block in a transform unit equal in size to the residual block, and entropy-encode the quantized transform coefficients. When it is selected to encode just one subblock of the residual block, the video encoding apparatus may perform transform and quantization on the subblock corresponding to the transform position, and entropy-encode the quantized transform coefficients. Residual signals of other subblocks corresponding to non-transformed positions are all considered to be 0, which obviates the need to transform coefficient information.

In Step S1060, the video encoding apparatus may apply an inverse quantization/inverse transform process to the quantized transform coefficients to reconstruct residual signals corresponding to the transform positions and set all residual signals of other subblocks corresponding to the non-transformed positions to 0, thereby reconstructing the residual block for the current block. The video encoding apparatus may add up the reconstructed residual block with the prediction block to generate a reconstructed current block.

In Step S1070, the video encoding apparatus may perform deblocking filtering at least on the reconstructed current block, and store the filtered current block in a buffer, e.g., the memory 190 of FIG. 1 for use as a reference picture for inter prediction of coming blocks in a picture to be encoded. In particular, the video encoding apparatus may set a grid at N samples at regular intervals in the horizontal and vertical directions and determine whether to apply deblocking filtering to the current block based on whether the boundary between the subblocks of the residual block coincides with the grid boundary. The video encoding apparatus may perform deblocking filtering only when the boundary between the two residual subblocks in the current block coincides with the grid boundary. In other words, deblocking filtering may be performed only when the 4×4-unit (or the 8×8-unit) deblock boundary coincides with the boundary between the residual subblocks.

Figure 11:
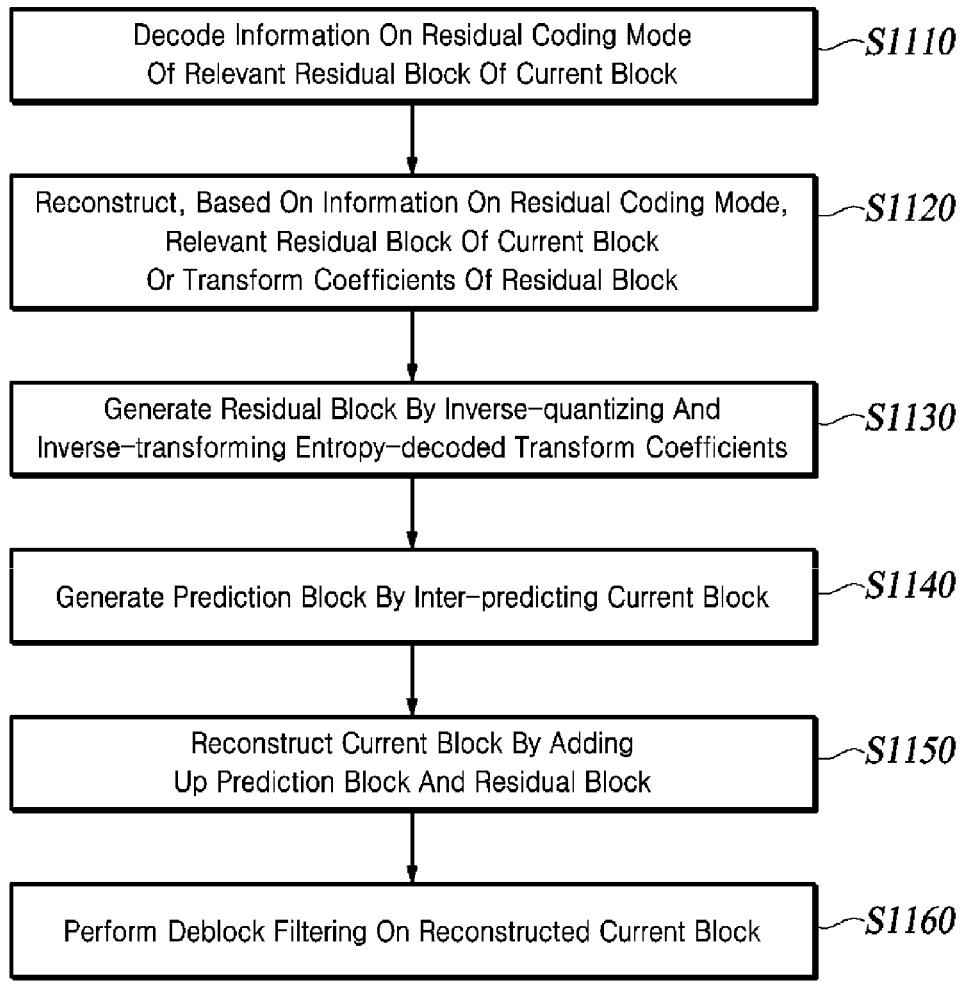
FIG. 11 is a flowchart of a method by a video decoding apparatus for decoding an inter prediction-coded current block from a coded video bitstream according to at least one embodiment of the present disclosure.

FIG. 11 is a flowchart of a method by a video decoding apparatus for decoding an inter prediction-coded current block from a coded video bitstream according to at least one embodiment of the present disclosure.

In Step S1110, the video decoding apparatus, e.g., the entropy decoding unit of FIG. 4 may decode information on the residual coding mode of a relevant residual block of the current block.

For example, the video decoding apparatus may decode, from the bitstream, a first flag indicating whether the encoded was a relevant residual block of the current block or one subblock alone of the residual block. The first flag when having a first value (e.g., "0") may indicate that the residual block has been transformed, and the first flag having a second value (e.g., "1") may indicate that one subblock alone of the residual block has been transformed.

When the first flag indicates that just one subblock of the residual block has been transformed, the video decoding apparatus may further decode, from the bitstream, one or more syntax elements representing the partition type (split direction and/or split ratio) of the residual block, and may determine a partition type of the residual block based at least in part on the decoded one or more syntax elements. Various partition types may exist according to the split direction and split ratio. For example, the partition types may include the first type that provides splitting horizontally symmetrically into two subblocks, the second type that provides splitting vertically symmetrically into two subblocks, the third type that provides splitting horizontally asymmetrically into two subblocks (e.g., with a ratio of 1:3 or 3:1), and the fourth type that provides splitting vertically asymmetrically into two subblocks (e.g., with a ratio of 1:3 or 3:1).

In determining the partition type, the width and height of the current block may be further considered along with the information indicating the partition type. The use of some partition types (or split direction and/or split ratio) may be restricted depending on the width and height of the current block, which can exempt signaling of syntax elements expressing the same partition types (or split direction and/or split ratio).

At least one embodiment may be responsive to when the width and height of the current block are both smaller than 16 pixels for disallowing the current block from being split "in a 1:3 ratio or a 3:1 ratio." Accordingly, when the width and height of the residual block are both smaller than 16 pixels, the video decoding apparatus may just infer the split ratio to be 1:1 without having to decode a syntax element indicating the split direction, e.g., a 1-bit flag.

Another embodiment may be responsive to when the width (or height) of the current block is less than 8 pixels for disallowing the current block from being split in the vertical direction (or horizontal direction). Therefore, when the width of the residual block is less than 8 pixels, the video decoding apparatus may just infer the split direction to be the horizontal direction without having to decode a syntax element indicating the split direction. In the same manner, when the height of the residual block is less than 8 pixels, the video decoding apparatus may just infer the split direction to be the vertical direction without having to decode the syntax element indicating the direction.

To identify a subblock from which transform coefficient information is to be decoded, the video decoding apparatus may further decode, from the bitstream, a syntax element (e.g., a 1-bit flag) indicating the position of the encoded subblock, and thus the subblock position where transform has been performed. In some embodiments, the video decoding apparatus may be responsive to when the partition type of the current block is the third type or the fourth type for immediately considering the smaller subblock to be the one that underwent a transform between the two blocks while skipping decoding of the syntax element for indicating the subblock position where transform was performed.

In Steps S1120 to S1130, the video decoding apparatus may reconstruct a relevant residual block of the current block based on the decoded residual coding mode information.

When the first flag indicates that the relevant residual block of the current block was encoded, the video decoding apparatus may decode, from the bitstream, transform coefficient information for the residual block to reconstruct the transform coefficients. Thereafter, the video decoding apparatus inverse quantizes the transform coefficients and performs transform on the inverse quantized transform coefficients in a transform unit equal in size to the residual block, thereby reconstructing the residual block of the current block.

When the first flag indicates that just one subblock of the residual block was encoded, the video decoding apparatus may decode, from the bitstream, transform coefficient information for the subblock corresponding to the transform position to reconstruct the transform coefficients. Thereafter, the video decoding apparatus inverse quantizes and inverse transforms the transform coefficients to generate residual signals for the subblock corresponding to the transform position, and sets all residual signals of the other subblock corresponding to a non-transform position to 0, thereby reconstructing the residual block of the current block.

In Step S1140, the video decoding apparatus may generate a prediction block by inter-predicting the current block and may reconstruct the current block by adding up the prediction block and the residual block.

In Step S1150, the video decoding apparatus may perform deblocking filtering on the reconstructed current block, and store the filtered current block in a buffer, e.g., the memory 470 of FIG. 4 for use as a reference picture for inter prediction of coming blocks in a picture to be encoded. The video decoding apparatus may set a grid of N samples at regular intervals in the horizontal and vertical directions and determine, based on the boundary of the set grid, whether to apply deblocking filtering to the current block. For example, deblocking filtering may be applied to a boundary between the current block and other blocks that have already been decoded when that boundary coincides with the grid boundary. Additionally, deblocking filtering may be applied to a boundary between subblocks of the residual block when that boundary coincides with the grid boundary. A grid in different units may be used depending on whether the current block is a luma block or a chroma block. For example, a grid may be set in units of 4×4 for a luma block and a grid may be set in units of 8×8 for a chroma block.

It should be understood that the above description presents the illustrative embodiments that may be implemented in various other manners. The functions described in some embodiments may be realized by hardware, software, firmware, and/or their combination. It should also be understood that the functional components described in this specification are labeled by " . . . unit" to strongly emphasize their stand-alone implementability.

Meanwhile, various methods or functions described in the present disclosure may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read-only memory (EPROM), flash drive, optical drive, magnetic hard drive, and solid-state drive (SSD) among others.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A video decoding method, the method comprising:
decoding, from a bitstream, a flag indicating whether residual signals corresponding only to a partial region of a current block have been encoded;
reconstructing transform coefficients by decoding, from the bitstream, transform coefficient information for one subblock of two subblocks split from the current block, when the flag indicates that the residual signals corresponding only to the partial region of the current block have been encoded;
predicting the current block to generate a prediction block;

generating a residual block for the current block by performing an inverse quantization and an inverse transform on the transform coefficients in the one subblock for which the transform coefficient information has been decoded;

reconstructing the current block by adding up the prediction block and the residual block; and setting a grid of N samples on the reconstructed current block at regular intervals in horizontal and vertical directions and performing deblock filtering on a boundary between the two subblocks in the current block that coincides with matches a boundary of the grid;

wherein reconstructing the transform coefficients comprises:

decoding, from the bitstream, one or more syntax elements indicating a partition type of the current block;

determining a partition type for the current block to be split into the two subblocks depending on the one or more syntax elements indicating the partition type of the current block and a width and a height of the current block; and decoding transform coefficient information corresponding only to the one subblock of the two subblocks that is determined according to the partition type;

wherein the partition type specifies a split ratio and a split direction; and wherein available split ratios and available split directions for the current block are limited according to the width and height of the current block to provide 4 pixels or more for a height or a width of the subblock to undergo the inverse transform.

2. The method of claim 1, wherein reconstructing the transform coefficients comprises:

generating the residual block for the current block by performing the inverse quantization and the inverse transform on the transform coefficients in the one subblock for which the transform coefficient information has been decoded to generate residual signals for the one subblock of the two subblocks, and by setting residual signals of another subblock of the two subblocks to zero.

3. The method of claim 1, wherein the partition type for the current block comprises:

a first type in which the current block is symmetrically split in the horizontal direction;

a second type in which the current block is symmetrically split in the vertical direction;

a third type in which the current block is asymmetrically split in the horizontal direction; and a fourth type in which the current block is asymmetrically split in the vertical direction.

4. The method of claim 3, wherein decoding the transform coefficient information comprises:

decoding the transform coefficient information exclusively for a relatively small subblock between the two subblocks when the partition type is the third type or the fourth type.

5. A video encoding method, the method comprising:

predicting a current block of video data to generate a prediction block;

generating a residual block for the current block based on the prediction block;

determining that residual signals within a partial region of the residual block is signaled for the current block, the partial region corresponding to one subblock of two subblocks split from the current block;

encoding, into a bitstream, a flag indicating that the residual signals within the partial region of the residual block is signaled;

encoding, into the bitstream, one or more syntax elements indicating a partition type of the current block which specifies a split ratio and a split direction, wherein available split ratios and available split directions for the current block are limited according to the width and the height of the current block to provide 4 pixels or more for a height or a width of the subblock to undergo the inverse transform;

performing a transform and a quantization on the residual signals within the partial region to encode the residual signals within the partial region of the residual block into the bitstream;

reconstructing the current block to use for encoding of other blocks of the video data; and setting a grid of N samples on the reconstructed current block at regular intervals in horizontal and vertical directions and performing deblock filtering on a boundary between the two subblocks in the current block that coincides with matches a boundary of the grid.

6. A method for providing video data to a video decoding device, the method comprising:

encoding a video data into a bitstream; and transmitting the bitstream to the video decoding device, wherein the encoding of the video data includes:

predicting a current block of the video data to generate a prediction block;

generating a residual block for the current block based on the prediction block;

determining that residual signals within a partial region of the residual block is signaled for the current block, the partial region corresponding to one subblock of two subblocks split from the current block;

encoding, into a bitstream, a flag indicating that the residual signals within the partial region of the residual block is signaled;

encoding, into the bitstream, one or more syntax elements indicating a partition type of the current block which specifies a split ratio and a split direction, wherein available split ratios and available split directions for the current block are limited according to the width and the height of the current block to provide 4 pixels or more for a height or a width of the subblock to undergo the inverse transform;

performing a transform and a quantization on the residual signals within the partial region to encode the residual signals within the partial region of the residual block into the bitstream;

reconstructing the current block to use for encoding of other blocks of the video data; and setting a grid of N samples on the reconstructed current block at regular intervals in horizontal and vertical directions and performing deblock filtering on a boundary between the two subblocks in the current block that coincides with matches a boundary of the grid.

* * * * *